United States Patent Office 3,057,436
Patented Oct. 9, 1962

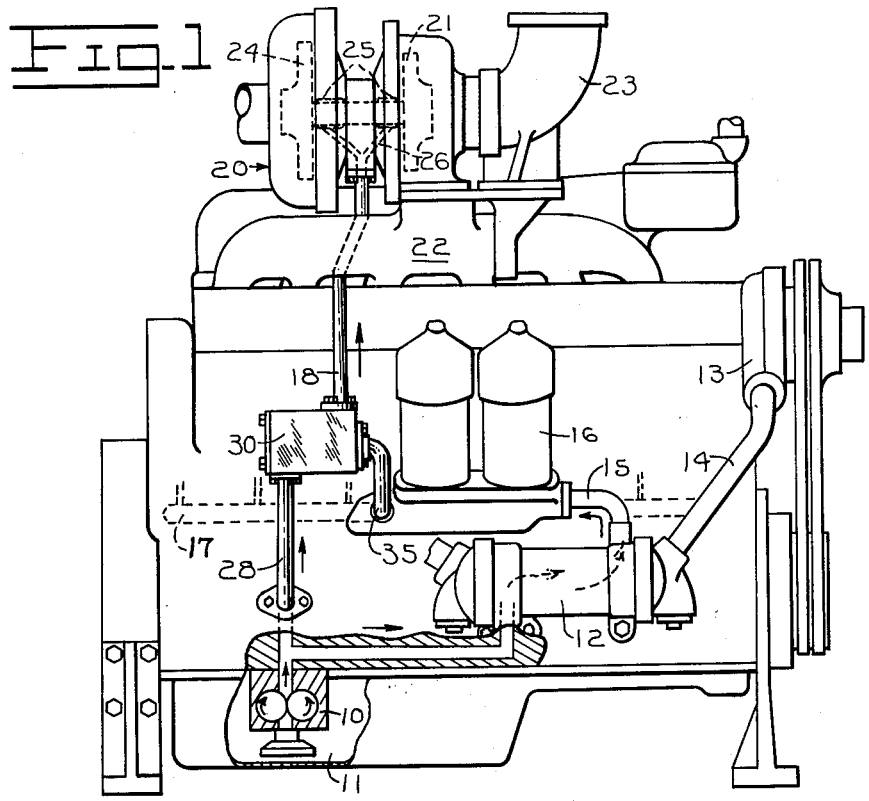
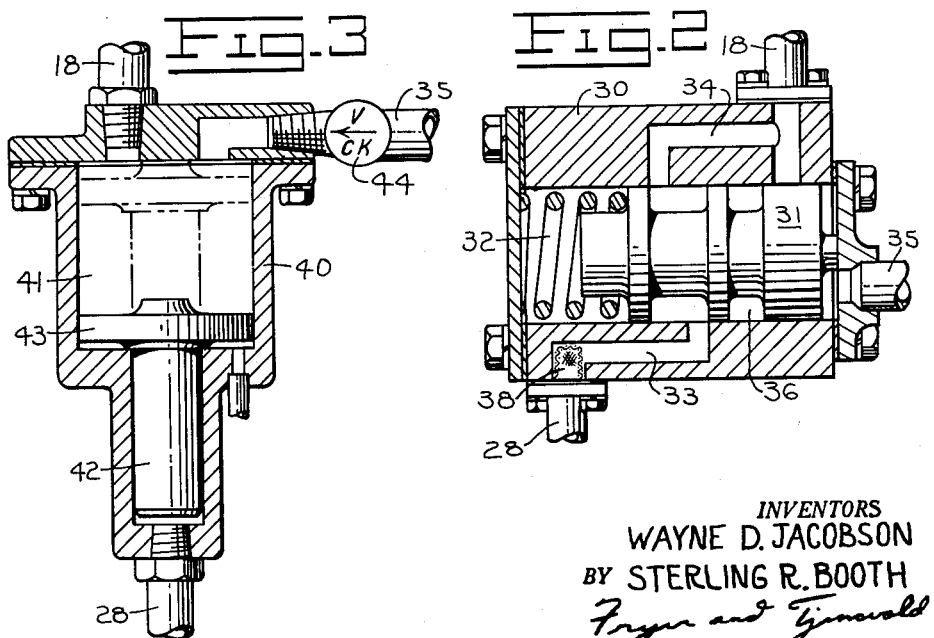

3,057,436
SYSTEM FOR LUBRICATION OF ENGINE
TURBOCHARGERS
Wayne D. Jacobson, Washington, and Sterling R. Booth, Yates City, Ill., assignors to Caterpillar Tractor Co., Peoria, Ill., a corporation of California
Filed Sept. 1, 1960, Ser. No. 53,462
6 Claims. (Cl. 184—6)

This invention relates to the lubrication of internal combustion engines equipped with turbochargers and particularly to the lubrication of the bearings of the turbocharger during the initial period of operation of the engine.

The bearings of high speed turbochargers are ordinarily lubricated by the usual engine lubricating system which includes an engine driven pump, a filter and often a heat exchanger or cooler to reduce the temperature of the oil as it is circulated to various parts of the engine.

Upon starting a cold engine, a period of time is required for the pump to fill voids in the system and to establish full circulation through the cooler and filter. For example in a particular engine which may be taken as typical, it requires about 45 seconds to produce as much as 10 pounds of pressure on the discharge side of the cooler and filter where the oil is available for lubrication purposes. On the same engine from a cold start, the turbocharger obtains a speed of 34,000 r.p.m. in six seconds. While this delay in supplying lubricant under pressure to the engine bearings and parts operating at normal engine speed is not necessarily harmful, it is the cause of many premature failures of the high speed turbocharger bearings.

In addition to voids in a lubricating system which occur due to drainage of oil from some parts when the engine is shut down, a substantial pressure drop normally occurs through a filter of 10 to 15 p.s.i. and through a cooler of 15 to 20 p.s.i. This also contributes to the delay in obtaining full operating pressure upon starting.

It is, therefore, an object of this invention to provide means operable upon starting of an engine to utilize a great portion of force of the pump for directing oil to the turbocharger bearings until substantial pressure builds up in the entire system.

Another object of the invention is to provide means to by-pass the cooler and filter upon initial starting so as to communicate oil more directly from the pump to the turbocharger and insure adequate lubrication of its bearings in a very short time.

Further and more specific objects and advantages of the invention are made apparent in the following specification wherein it is described in detail by reference to the accompanying drawing.

In the drawing:

FIG. 1 is a schematic view in side elevation of an engine having a turbocharger and equipped with the lubrication system of the present invention;

FIG. 2 is an enlarged sectional view of a by-pass and control valve illustrated in FIG. 1 which forms a part of the invention; and FIG. 3 is a similar view of a modified form of control member which may be employed instead of the by-pass and control valve shown in FIG. 2.

The engine which is shown in FIG. 1 is illustrated as provided with a conventional engine driven pump 10, the function of which is to withdraw lubricating oil from the usual sump 11 and direct it through a cooler 12 which is also of conventional construction and utilizes coolant from the engine cooling system furnished by a pump 13 and conduit 14 for reducing the temperature of the oil. Upon leaving the cooler, the oil is directed by a conduit 15 through a filter 16 and to a manifold illustrated in dotted lines at 17 which in turn directs oil to the various parts of the engine to be lubricated. A conduit 18 also receives oil discharged from the filter and directed to a turbocharger generally indicated at 20. The turbocharger includes the usual turbine wheel 21 driven by exhaust gases from a manifold 22 and discharging the gases through a stack fitting 23. A compressor wheel 24 is mounted on the same shaft as the turbine wheel and serves to direct air under pressure into the intake manifold of the engine which is not shown but the construction and operation of which are well known. Bearings such as indicated at 25 support the high speed turbocharger shaft and oil from the line 18 is directed to these bearings as by passages indicated at 26.

A by-pass line 28 communicates directly with the line 18 through a special valve and control mechanism 30 for the purpose of by-passing the cooler 12 and filter 16 and directing the greater part of the output of the pump to the turbocharger bearings upon starting of the engine and without waiting for the voids in the lubricating system to be filled by the action of the pump. The valve and control 30 is shown in FIG. 2 as having a cylindrical bore for a valve spool 31. When the engine is shut down, the spool 31 is urged to the right as seen in FIG. 2 by a spring 32 and upon initial starting of the engine oil is free to flow from the line 28 through a passage 33 thence through the cylindrical bore of the valve and by way of a passage 34 to the line 18 and to the turbocharger. A line 35 communicates between the filter 16 and the member 30 and, as pump pressure builds up shortly after the engine is started and has passed the cooler and filter, pressure is introduced to the line 35 into the cylindrical bore at the end of the spool opposite the spring 32. This moves the spool leftward, as shown, until the passage 33 and communication with the turbocharger therethrough is blocked. An annular groove shown at 36 in the spool registers with the passage 33 when it is blocked simply to distribute pressure around the periphery of the spool rather than applying all of the pressure from one side. Since the oil directed to the turbocharger bearings upon initial starting of the engine is not filtered a screen 38, as shown in FIG. 2, is employed to prevent any large particles of foreign matter from reaching the turbocharger bearings during this brief period of operation. As soon as the pressure has built up to move the spool 31 and block the passage 33, all of the oil of course flows through the usual cooler and filter.

With the system herein disclosed applied to the typical engine hereinabove referred to, oil pressure at the turbocharger attains a value of 30 p.s.i. within 10 seconds after the engine has been started. This has proven adequate to protect the turbocharger bearings and prevent failure thereof.

A modified form of the invention which has the advantage of insuring a supply of filtered oil to the turbocharger at all times is shown in FIG. 3 wherein a control member 40 is illustrated as occupying the same position as the control member 30 in FIG. 1, being connected between the same conduits 18, 28 and 35. This member has a supply cylinder 41 containing a supply of oil adequate for lubrication of the turbocharger bearings during the initial starting period of the engine. The discharge of the pump is directed through line 28 to a reduced end 42 of a piston which has an enlarged end 43 reciprocable in the cylinder 41. A supply of oil is trapped in the cylinder 41 when the engine is shut down and, upon starting, the pressure from the pump raises the piston 43 to direct the oil through line 18 and to the turbocharger bearings. A check valve 44 is provided in line 35 to prevent flow of this oil back toward the filter. As the pump pressure builds up filling the voids in the system, it enters the cylinder 41 through line 35 and acting upon the larger portion 43 of the piston returns it to the position shown in FIG. 3. Filtered oil is then communicated to the turbocharger through the line 18 and the cylinder 41 has been provided with a fresh supply of filtered oil for use when the engine is next started.

We claim:

1. In combination with an engine having a turbocharger and having a lubrication system including a pump driven by the engine and a filter communicating with the discharge of the pump, a by-pass communicating between the pump and turbocharger while the engine is shut down whereby upon starting of the engine lubricant will be directed to the turbocharger therethrough and means operable upon building up of pressure on the downstream side of the filter to close said by-pass.

2. In combination with an engine having a turbocharger and having a lubrication system including a pump driven by the engine and a filter communicating with the discharge of the pump, means operable upon starting of the engine to employ pump output pressure to insure prompt selective lubrication of the turbocharger, and means operable when pressure in the lubrication system on the downstream side of the filter has attained a predetermined value to direct pressure throughout the entire system.

3. In combination with an engine having a turbocharger and having a lubrication system including a pump driven by the engine and a filter communicating with the discharge of the pump, a by-pass line between the discharge of the pump and the turbocharger by-passing the filter and the rest of the lubrication system, a spring opened valve in said by-pass line, and means for closing said valve when pressure on the downstream side of the filter attains a predetermined value.

4. In combination with an engine having a turbocharger and having a lubrication system including a pump driven by the engine and a filter communicating with the discharge of the pump, a cylinder with a retracted piston therein positioned to entrap filtered oil in the system, a conduit connecting said cylinder with the turbocharger, a second conduit connecting said cylinder behind the retracted piston with the discharge of the pump upstream of the filter whereby upon starting of the engine the piston will be advanced to direct the entrapped oil to the turbocharger before pressure builds up through the filter, a third conduit between the downstream side of the filter and the cylinder in a position to effect retraction of the piston when pressure has built up through the filter, and a check valve in said third conduit to prevent flow of oil from the cylinder toward the filter.

5. In an engine having a lubrication system including an engine driven pump, a filter communicating with the discharge side of the pump, and distribution means on the downstream side of the filter to communicate filtered lubricant to engine parts, a second distribution means for preferential lubrication of selected engine parts, a by-pass connecting the discharge side of the pump with said second distribution means to direct unfiltered lubricant thereto upon starting of the engine, a normally open valve in said by-pass, and means actuated by pressure of lubricant on the downstream side of the filter for closing said valve.

6. In an engine having a lubrication system including an engine driven pump, lubricant treating means communicating with the discharge side of the pump which restricts flow when the engine is started, distribution means on the downstream side of said treating means to communicate treated lubricant to engine parts, a second distribution means for preferential lubrication of selected engine parts, a by-pass connecting the discharge side of the pump with said second distribution means to direct untreated lubricant to said distribution means and engine parts upon starting of the engine and pump, a valve in said by-pass, means biasing said valve to its open position, and means actuated by pressure of lubricant on the downstream side of said treating means to overcome the biasing means and close the valve.

References Cited in the file of this patent

UNITED STATES PATENTS

| | | |
|---|---|---|
| 1,931,060 | Cochrane | Oct. 17, 1933 |
| 2,691,429 | Kovacs | Oct. 12, 1954 |
| 2,725,954 | Nallinger | Dec. 6, 1955 |

FOREIGN PATENTS

| | | |
|---|---|---|
| 942,234 | Germany | Apr. 26, 1956 |